G. WINTER & F. EICHBERG.
ALTERNATING CURRENT DYNAMO ELECTRIC MACHINE.
APPLICATION FILED AUG. 3, 1906.

1,016,865.

Patented Feb. 6, 1912.

Witnesses:

Inventors:
Gabriel Winter,
Friedrich Eichberg,
by Albert G. Davis
Att'y.

UNITED STATES PATENT OFFICE.

GABRIEL WINTER, OF VIENNA, AUSTRIA-HUNGARY, AND FRIEDRICH EICHBERG, OF BERLIN, GERMANY, ASSIGNORS TO GENERAL ELECTRIC COMPANY, A CORPORATION OF NEW YORK.

ALTERNATING-CURRENT DYNAMO-ELECTRIC MACHINE.

1,016,865. Specification of Letters Patent. Patented Feb. 6, 1912.

Original application filed June 11, 1902, Serial No. 111,180. Divided and this application filed August 3, 1906. Serial No. 329,022.

*To all whom it may concern:*

Be it known that we, GABRIEL WINTER and FRIEDRICH EICHBERG, subjects of the Emperor of Austria-Hungary, residing, respectively, at Vienna, in the Empire of Austria-Hungary, and at Berlin, in the Empire of Germany, have invented certain new and useful Improvements in Alternating - Current Dynamo - Electric Machines, of which the following is a specification.

This application is a division of our former application, Serial No. 111,180, filed June 11, 1902. In that former application we described an alternating-current motor of the commutator type in which the two members of the motor are provided with primary and secondary windings, respectively, arranged to produce a single magnetization along a fixed line constituting the working axis, means for supplying to the windings voltages of relatively varying magnitudes, and means for magnetizing the motor in a second direction at an angle to the first. As described in that application, the means for producing the second magnetization of the motor comprises a magnetizing winding on either stator or rotor, which may be separate from the other two windings, or combined with either primary or secondary winding. When a magnetizing winding is placed upon the rotor, either as an independent winding or in combination with the secondary winding, current is supplied to it through a second system of brushes displaced ninety electrical degrees from the other brushes.

Our present application relates specifically to this modification, in which the magnetizing current is supplied through commutator brushes.

Our invention will best be understood by reference to the accompanying drawings, in which—

Figure 1:
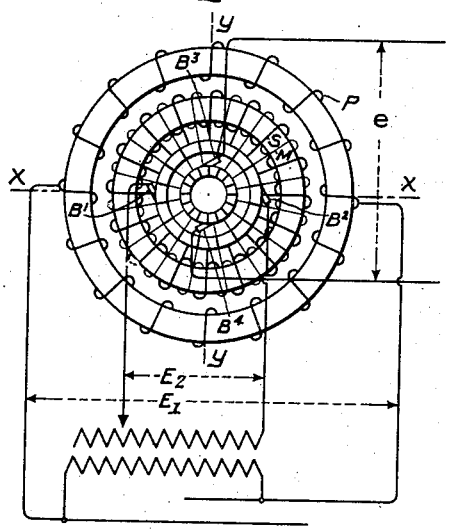
Figure 2:
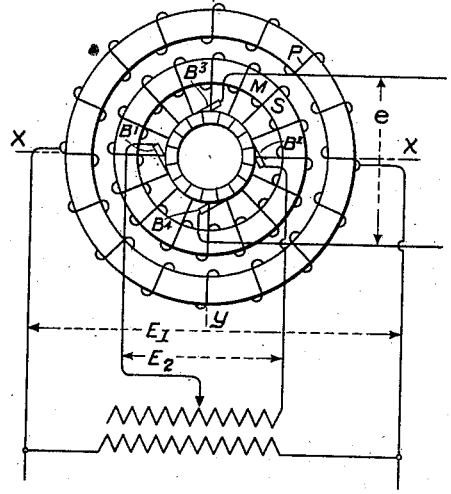
Figure 3:
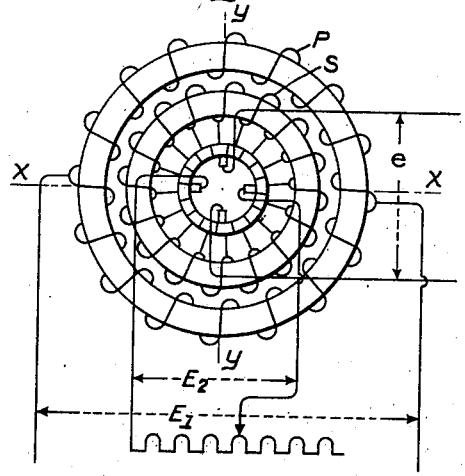
Figure 4:
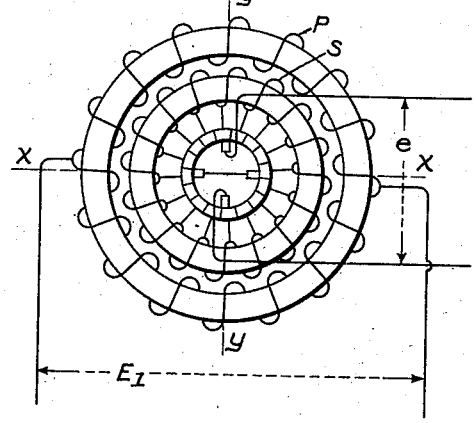
Figure 5:
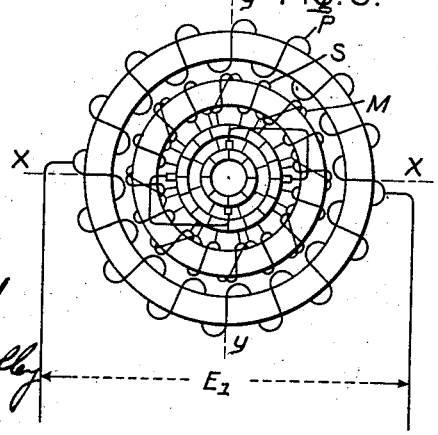

Figure 1 shows a motor arranged in accordance with our invention, with the magnetizing winding distinct from the secondary winding of the rotor; Fig. 2 shows the magnetizing winding combined with the secondary winding; Fig. 3 shows an arrangement similar to Fig. 2, except that the secondary winding is closed through a variable impedance, instead of through a counter-electromotive force; Fig. 4 shows a similar arrangement with the secondary winding directly short-circuited; and Fig. 5 shows one suitable arrangement of connections for the magnetizing winding.

If voltages of the same phase are impressed on the primary and secondary windings (hereinafter referred to as P and S, respectively) of an alternating current transformer, then, when the ratio of these voltages corresponds to the ratio of transformation of P and S, the current flowing in each of the windings will produce one-half of the magnetic field of the transformer,—*i. e.*, when the ratio of transformation is one, each winding takes one-half the magnetizing current, or, generally stated, each winding gives one half the total magnetizing ampere turns—while the electromotive forces (E. M. F.'s) induced thereby in the windings will bear to each other a ratio corresponding to the ratio of transformation and will be opposed to the respective impressed voltages; but when the windings P and S are connected to voltages of a ratio different from the ratio of transformation, the winding P will take from the source a larger current, for example, while S will then return current to the source, since in this example the voltage induced in P is less than the voltage impressed thereon, and since the voltage induced in S is greater than the voltage impressed thereon. The difference between the energies corresponding to these two currents is the total energy loss of the transformer, including ohmic and iron losses.

We take advantage of the above transformer action in one of our arrangements for motor control as follows: Let the primary and secondary winding system be arranged in the manner illustrated in Fig. 1 of the accompanying diagrammatic drawing,—*i. e.*, as separate bipolar ring windings disposed in such a way that S can move independently of P, while the points of connection to the source and therefore the magnetic poles of S are maintained on the line $x$ $x$, (constituting the working axis) which can be easily attained by providing the winding S with a segmental commutator and causing the current to be supplied through brushes situated on line $x$ $x$. If now there be added to the windings P and S a winding M so arranged that the current in it produces a magnetic field having the axis $y\ y$ at right angles to the axis of the field of the windings P and S, and if the current supplied to the winding M corresponds as nearly as possible in phase to the currents in P and S; then a torque is produced which is proportional to the field of winding M, to the ampere turns of the rotor S and to the cosine of the displacement of phase between both of these last magnitudes. The counter electromotive force occurring at the commutator upon the rotation of the rotor, in the field having the axis $y\ y$, has its greatest effective value on the line $x\ x$, and is in phase with the magnetic field having the axis $y\ y$.

If the phase angle between the electromotive force connected to S (this electromotive force being hereinafter referred to as $E_2$) and the magnetic field of M is very small and the influence of the magnetic leakage and ohmic loss is disregarded, then the counter electromotive force due to the rotation which is in phase with the magnetic field of M, is consequently nearly in the same or opposite direction to that of the electromotive force connected to the rotor and is also nearly in the same or opposite direction to the electromotive force generated in the rotor by the primary field on the axis $x\ x$, since this latter electromotive force is substantially in phase with the electromotive force $E_2$ impressed on the secondary. With increasing speed the counter electromotive force due to rotation increases, and consequently the resultant electromotive force upon winding S decreases when the counter-electromotive force is opposed to the electromotive force connected to the rotor.

Any desired speed within practicable limits can be provided for by supplying to said windings voltages of relatively varying magnitudes, that is, by making variations in the difference between the potential (hereinafter called $E_1$) supplied to the stator winding P, and the potential $E_2$ supplied to the rotor winding S. If the fall or loss in potential in the windings were not taken into account and the number of turns of windings P and S are assumed equal, then it could be said that the speed which the rotor acquires is proportional to the difference $E_1 - E_2$ when the magnetic field having its axis on the line $y\ y$ is of constant strength. That is, when $E_1 = E_2$ the motor stands still. If $E_1$ is greater than $E_2$, the motor speeds up until the counter-electromotive force, due to rotation, equals $E_1 - E_2$. If $E_2 = 0$, the motor speeds up until the counter-electromotive force equals $E_1$. This is the condition with winding S directly short-circuited. In this case, if the field of the winding M equals the field of winding P, the motor runs synchronously. On this principle may be provided a starting and controlling system whereby for example the stator is subjected to a nearly constant voltage while the rotor has impressed upon it a voltage of lesser ratio to the voltage of the stator than the ratio of windings, the difference of the quotients of the impressed voltage and the number of turns of stator and rotor respectively being in accordance with the speed required. The speed is also dependent upon the strength and phase of the magnetic field produced by the winding M and consequently, by variation of these magnitudes, a regulation can also be produced. With the same object in view the rotor potential can be maintained constant and the stator potential varied. If the rotor is turning and is then subjected to a potential corresponding to a higher number of revolutions then it advances to the higher speed but if on the other hand it is subjected to a potential which corresponds to a lower number of revolutions, then it acts as a brake and as a dynamo gives energy back to its circuit until its speed is sufficiently reduced. When a means of driving is provided such machines may be caused to act permanently as dynamos and then be connected in parallel as easily as ordinarily continuous current dynamos.

In the arrangement shown in Fig. 1 the winding M is placed on the rotor and is provided with a commutator distinct from the commutator to which the winding S is connected. The winding P is subjected to the full potential $E^1$, and the winding S to suitably reduced potential $E^2$ supplied through a system of brushes $B^1$ and $B^2$ and the segmental commutator. An electromotive force $e$ is supplied to the winding M through a second system of brushes $B^3$ and $B^4$ arranged in the line-wire $y\ y$.

In Fig. 2 the winding M is combined with the winding S, only a single commutator being employed. Instead of connecting the rotor with the secondary winding of the transformer divided into potential graduations, as shown in Fig. 2, it may be connected with or to an impedance which utilizes resistance, inductance, or capacity; the torque being determined by the adjusting of the impedance. Such an arrangement is shown in Fig. 3, in which the winding S is closed through a variable resistance. If the impedance is made very small,—that is, should the terminals be short-circuited then $E^2$ would be zero and winding P subjected to E as before, and current flowing through winding M again provides the excitation either by the stator or the rotor. Fig. 4 shows an arrangement in which winding S is directly short-circuited.

In the arrangements described heretofore it is evident that the field produced on the line $xx$ by the currents in windings P and S, which is the field that produces the counter-electromotive force in winding P and the secondary induced electromotive force in winding S, is ninety degrees out of phase with the voltage impressed on winding P. The field produced on the line $yy$, however, has been assumed to be approximately in phase with the currents in windings P and S. Therefore, it will be seen that the two fields tend to produce a rotary field which is more or less uniform, according as the two component fields vary in relative strength and the phase of the currents in windings P and S varies relatively to the voltage impressed on winding P. It is not necessary, however, that the two components of this rotary field should be produced by currents coming from external sources of voltages of different phases. The magnetic field M may be excited by current coming from the brushes, and in that case a field winding system of few turns would be used in order to permit the use of a low voltage at the commutator, instead of a system of many turns, such as would be suitable when field M is excited from the external source of comparatively high voltage. Fig. 5 shows such an arrangement. In this figure winding M is connected in series with winding S. With this arrangement the field M must obviously be always in phase with the rotor current.

Not only the arrangement of apparatus illustrated in Fig. 1 but also the other apparatus hereinafter described, can be used as generators because, upon excitation through a determined magnetic field, an electromotive force must in all cases arise at the rotating armature and this electromotive force, quite independently of the number of revolutions of the rotor, is equal in phase and periodicity with the magnetic field.

All the figures relates to bi-polar arrangement and therefore only represent examples of construction. For an apparatus having a greater number of poles the magnetic field axes $xx$ and $yy$ are generally inclined to one another at an angle of ninety degrees divided by half the number of poles.

The windings on the stator are herein shown as ring windings, but it must be understood that all known and suitable open or closed windings can be used. The windings on the rotor are also shown as ring or Gramme windings; but all suitable closed windings, such as are used for continuous currents and with segmental commutators can be used.

What we claim as new and desire to secure by Letters Patent of the United States, is,

1. An alternating current motor of the commutator type, having brushes coöperating to form for each pair of primary poles, first, a path along the line of the primary field for the currents induced in the armature, and second, means for feeding a magnetizing current from outside for generating the torque-producing field of the motor.

2. In an alternating-current motor of the commutator type, brushes and connections therefor coöperating to form for each pair of primary poles, first, a path along the line of the primary field for the currents induced in the armature, and second, means for generating at all speeds a torque-producing field by feeding an appropriate magnetizing current from outside to the armature and separate means for impressing a counter-electromotive force on the armature.

3. In an alternating-current motor of the commutator type, brushes and connections therefor coöperating to form for each pair of primary poles, first, a path along the line of the primary field for the currents induced in the armature, and second, means for generating at all speeds a torque-producing field by feeding an appropriate magnetizing current from outside to the armature and separate means for impressing a variable counter-electromotive force on the armature.

4. In an alternating-current machine of the commutator type, brushes and connections therefor coöperating to form for each pair of primary poles, first along the line of the primary field (*i. e.* the working-axis), a path approximating the same axis for the working currents in the armature, and second, means for feeding from outside to the armature a magnetizing current, the connections for feeding said magnetizing current being arranged to supply at all speeds current substantially in phase with said working-currents and separate means for impressing a variable counter-electromotive force on the armature.

5. In an alternating-current machine of the commutator type, brushes and connections therefor coöperating to form for each pair of primary poles, first along the line of the primary field (*i. e.* the working-current axis), a path approximating the same axis for the working-currents in the armature, and second, separate brushes for feeding from outside a magnetizing current to the armature, the connections for feeding said magnetizing current being arranged to supply at all speeds current substantially in phase with said working-currents and separate means for impressing a counter-electromotive force on the armature.

6. In an alternating-current machine of the commutator type, brushes and connections therefor coöperating to form for each pair of primary poles, first, a path along the line of the primary field for the currents induced in the armature, and second, means for generating at all speeds a torque-producing field by feeding an appropriate magnetizing current from outside to the armature.

7. In an alternating-current machine of the commutator type, brushes and connections therefor coöperating to form for each pair of primary poles, first along the line of the primary field (i. e. the working-current axis), a path approximating the same axis for the working currents in the armature, and second, means for feeding from outside to the armature at all speeds a magnetizing current, substantially in phase with said working-currents.

8. In an alternating-current machine of the commutator type, brushes and connections therefor coöperating to form for each pair of primary poles, first along the line of the primary field (i. e. the working-current axis), a path approximating the same axis for the working-currents in the armature, and second, separate brushes for feeding from outside to the armature at all speeds a magnetizing current substantially in phase with said working currents.

9. In an alternating current machine of the commutator type, two systems of brushes and connections therefor coöperating to form for each pair of primary poles, first a path along the line of the primary field for currents induced in the armature, and second, a means for feeding a magnetizing current from outside for generating the torque-producing field of the machine.

In witness whereof, we have hereunto set our hands this 30th day of June, 1906.

GABRIEL WINTER.
FRIEDRICH EICHBERG.

Witnesses as to Gabriel Winter:
 ALVESTO S. HOGUE,
 AUGUST FUGGER.
Witnesses as to Friedrich Eichberg:
 HENRY HASPER,
 WOLDEMAR HAUPT.

---

Copies of this patent may be obtained for five cents each, by addressing the "Commissioner of Patents, Washington, D. C."